(12) United States Patent
Scheiwiller

(10) Patent No.: US 6,471,440 B1
(45) Date of Patent: Oct. 29, 2002

(54) PAVING STONE

(76) Inventor: Rolf Scheiwiller, Buolterlistrasse 9, CH-6052 Hergiswil (CH)

( * ) Notice: Subject to any disclaimer, the term of this patent is extended or adjusted under 35 U.S.C. 154(b) by 0 days.

(21) Appl. No.: 09/763,170

(22) PCT Filed: Aug. 12, 1999

(86) PCT No.: PCT/EP99/05874
§ 371 (c)(1),
(2), (4) Date: Feb. 16, 2001

(87) PCT Pub. No.: WO00/09808
PCT Pub. Date: Feb. 24, 2000

(30) Foreign Application Priority Data

Aug. 17, 1998 (DE) .......................................... 198 37 165
Apr. 15, 1999 (DE) .......................................... 199 17 113

(51) Int. Cl.⁷ ................................................. E01C 5/00
(52) U.S. Cl. ............................ 404/39; 404/34; 404/37; 404/41; 404/50
(58) Field of Search ............................. 404/17, 34, 37, 404/41, 50, 53, 54, 39; D25/113; 52/598, 603

(56) References Cited

U.S. PATENT DOCUMENTS

| | | | | |
|---|---|---|---|---|
| 468,840 A | * | 2/1892 | Steiger | 404/41 |
| 472,590 A | * | 4/1892 | Simpson | 404/41 |
| 1,410,729 A | * | 3/1922 | Balz | 110/338 |
| 1,505,174 A | * | 8/1924 | Triol | 404/50 |
| 1,969,729 A | * | 8/1934 | Damianik | 404/41 |
| 2,321,067 A | * | 6/1943 | de Witt | 404/50 |
| 2,605,681 A | * | 8/1952 | Trief | 404/41 |
| 3,722,162 A | * | 3/1973 | Ludvigsen | 404/41 |
| 3,873,225 A | * | 3/1975 | Jakobsen et al. | 404/41 |
| D265,689 S | * | 8/1982 | Miniere | D25/113 |
| 4,532,748 A | * | 8/1985 | Rotherham | 52/605 |
| 4,593,513 A | * | 6/1986 | Stratton | 404/41 |
| 5,052,158 A | * | 10/1991 | D'Luzansky | 404/41 |

FOREIGN PATENT DOCUMENTS

| | | |
|---|---|---|
| DE | 70 28 919 | 7/1970 |
| DE | 25 14 963 | 10/1976 |
| DE | 37 22 683 A1 | 1/1989 |
| DE | 197 04 425 A1 | 11/1997 |
| EP | 0 752 500 A1 | 1/1997 |
| EP | 0 761 884 A1 | 3/1997 |

* cited by examiner

Primary Examiner—Gary S. Hartmann
(74) Attorney, Agent, or Firm—Morgan, Lewis & Bockius LLP

(57) ABSTRACT

A paving stone (1) has a linkage securing against displacement. This is achieved by overengaging interlocking elements (6) and underengaging interlocking elements (5) being respectively provided on each side (3, 4) of the paving stone (1).

21 Claims, 15 Drawing Sheets

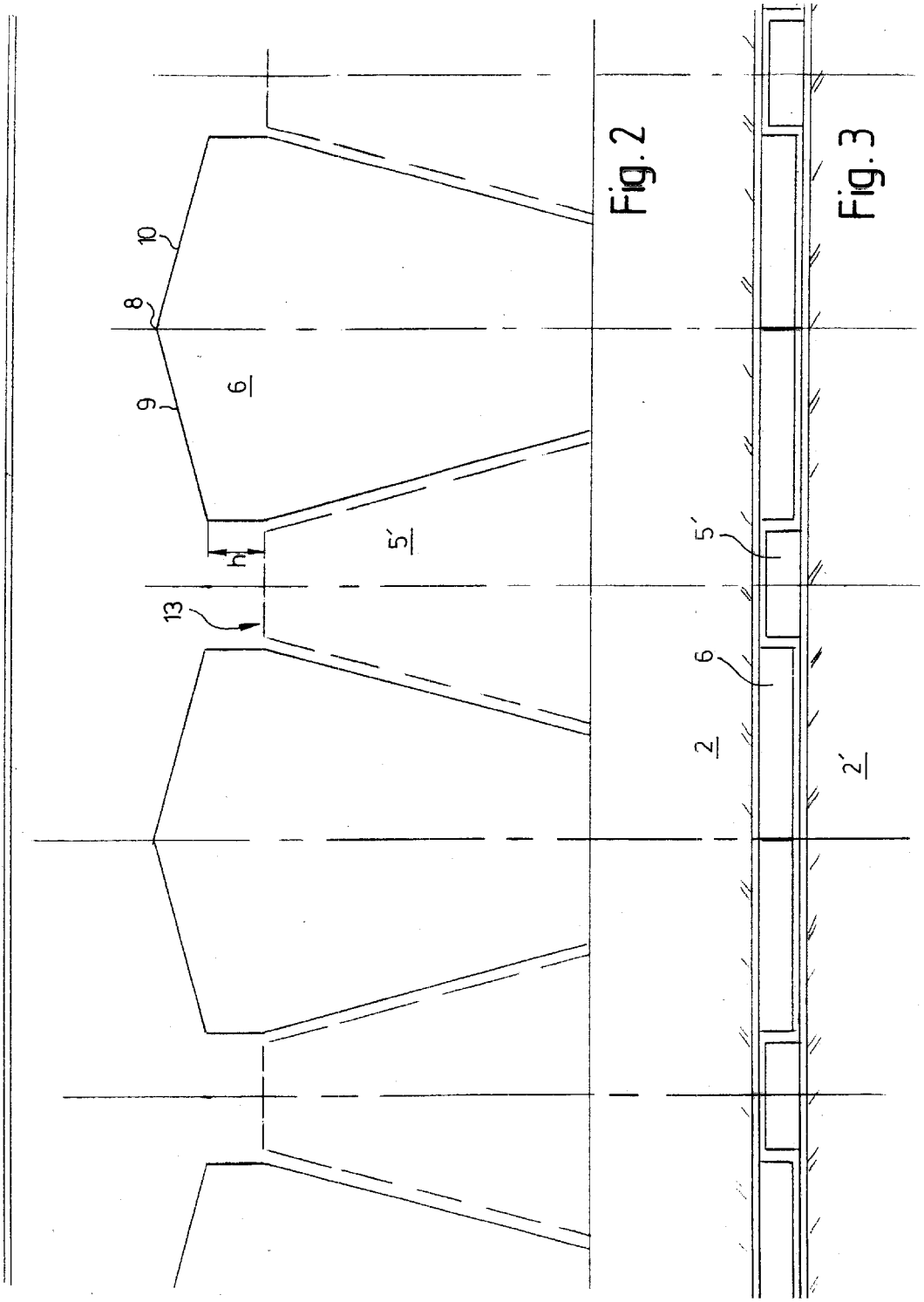

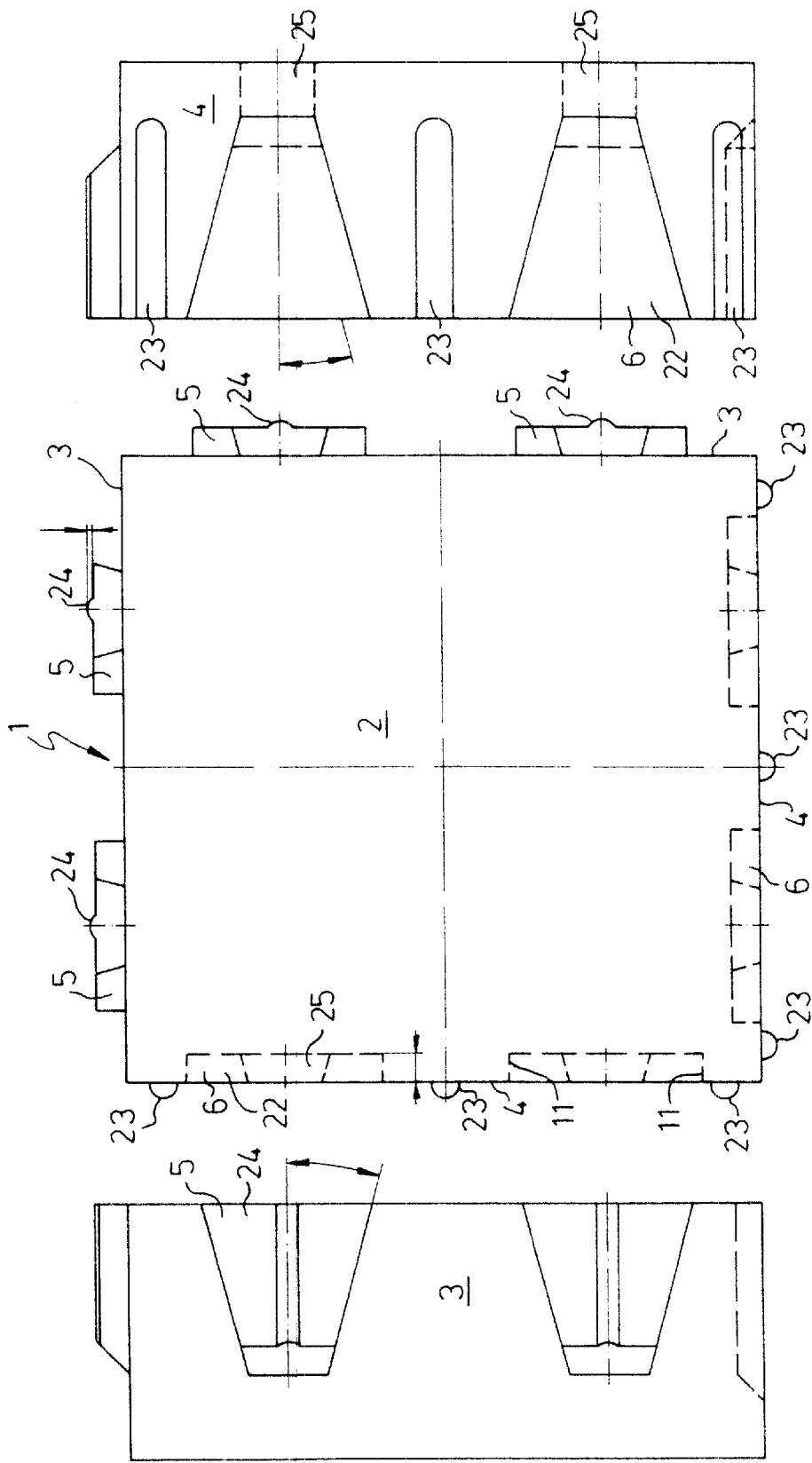

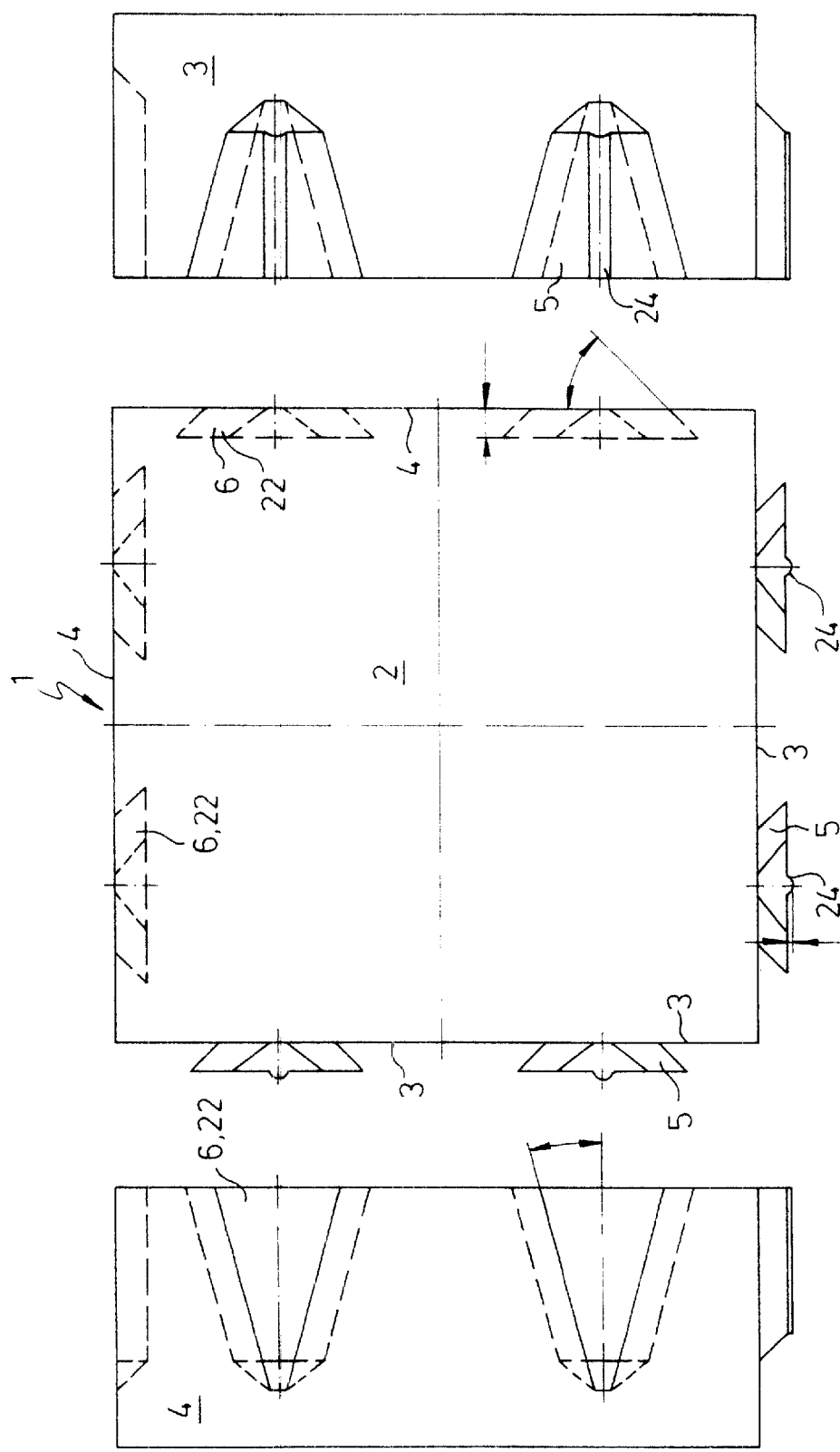

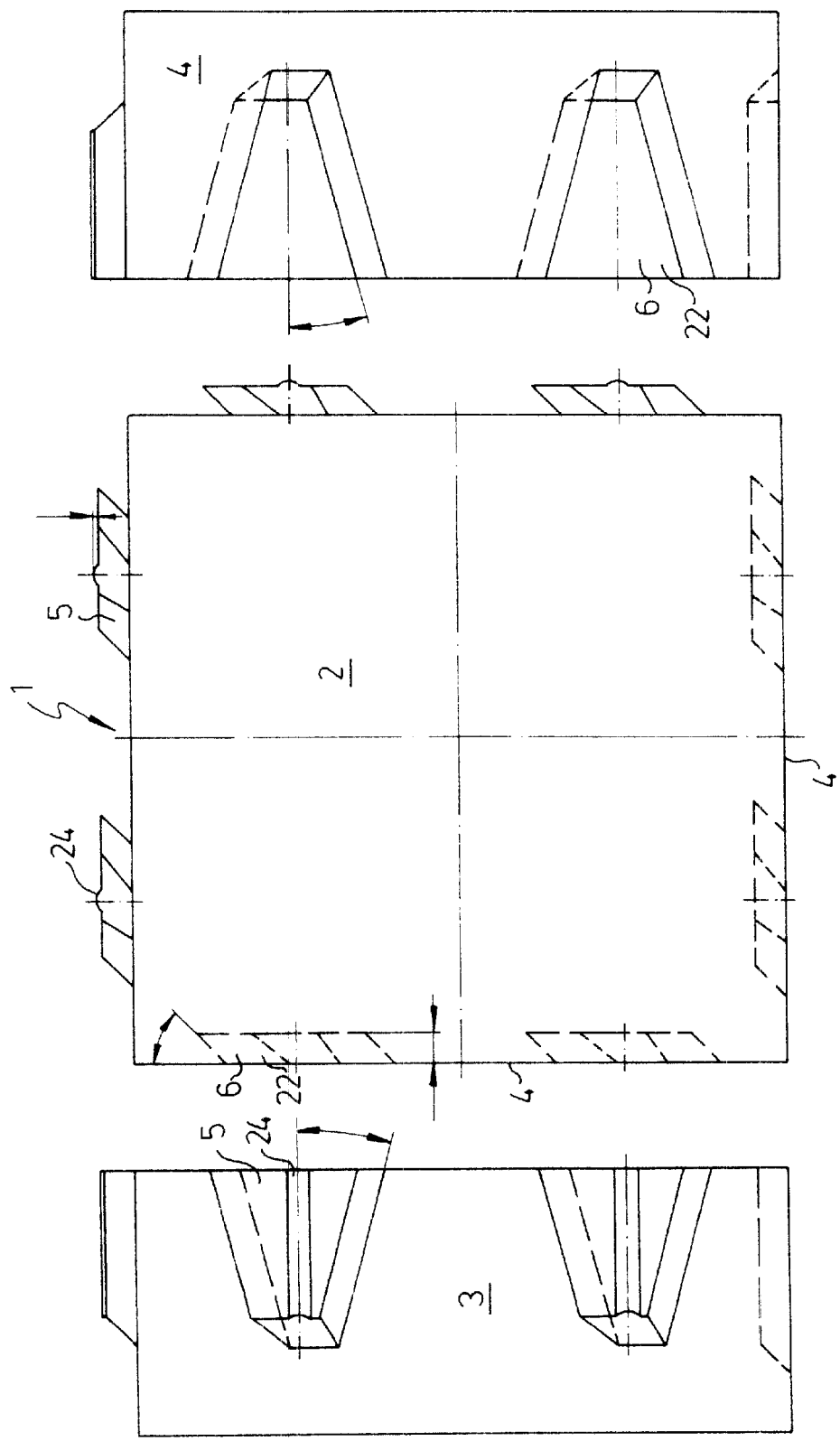

PAVING STONE

The invention relates to a paving stone, in particular made of concrete or the like, according to the precharacterizing clause of claim 1.

In the case of many known paving stone surfacings that are interlocked against lateral displacement, over time the stones are loosened in the linkage. Braking forces of vehicles driving on the surfacing cause the stones to be displaced in the direction of travel. Sand in the joints thereby flows away into the substructure or into the bed of chippings lying thereunder. This makes the stones free by the amount of play provided by the sand filling and they can easily shift both in the horizontal direction and in the vertical direction within a certain latitude. When driving on such a surfacing, this is noticeable from corresponding rolling noises.

To obtain a more stable paving stone linkage, in the past vertical interlocking formations have already been provided on paving stones. Such interlocking formations are to be found for example in EP 752 500 or in the document cited therein DE 70 28 919. Both prior-art configurations are provided on at least one side both with lugs and with niches. Although reliable vertical interlocking is achieved as a result, the laying of such paving stones is made difficult, since these paving stones are to be joined one onto the other only in a horizontal laying direction. This hinders laying by machine with corresponding lifting equipment and always entails the risk that, if there is a horizontal offset of the paving stones, material from the substructure is pushed together and gets between the sides of the stones.

It is therefore an object of the invention to propose a paving stone which has the advantages of vertical interlocking but can be laid in the vertical direction in a customary way.

This object is achieved on the basis of a paving stone of the type stated at the beginning by the characterizing features of claim 1.

Advantageous configurations and developments of the invention are possible by the measures stated in the subclaims.

Accordingly, a paving stone according to the invention is distinguished by the fact that only overengaging or only underengaging interlocking elements are respectively provided on each side of the paving stone provided with vertical interlocking elements. This makes it possible to join a paving stone with a side having only overengaging interlocking elements from above onto a side of an adjacent stone which has only underengaging interlocking elements. After laying, the paving stone with the overengaging interlocking elements secures the adjacent paving stone with underengaging interlocking elements in the vertical direction.

A paving stone according to the invention may be designed for example in such a way that one side is provided with overengaging interlocking elements and the opposite side is provided with underengaging interlocking elements. Consequently, the paving stone linkage can be laid row by row by customary placement from above. The two remaining side walls may be designed without vertical interlocking and consequently in such a way that they are freely displaceable in the vertical direction with respect to adjacent stones. In this embodiment, the vertical interlocking takes place from one row of stones to the next row of stones.

In a particularly advantageous embodiment of the invention, on the other hand, two orthogonally adjoining adjacent sides of the stone are provided with overengaging interlocking elements and two orthogonally adjoining adjacent sides of the stone are provided with underengaging interlocking elements. Such stones can continue as before to be placed in the laying direction from above into the already laid part of the paving stone linkage. As before, the paving stone linkage can be laid row by row, the respectively newly laid row being built up from one side. The paving stone to be laid next is laid into the corner formed between two stones of adjacent rows of paving stones and secures both adjacent stones in the vertical direction.

In one particular embodiment of the invention, the upper and lower interlocking elements are designed as lateral lugs. This has production-engineering advantages over the known configurations with niches.

In an advantageous exemplary embodiment of the invention, two or more lugs are provided on one side of the stone. This results in a more effective interlocking of the individual stones.

In a preferred embodiment of the invention, pockets for joint material are provided in the laid stone linkage, said pockets being formed for example by the interlocking elements and the joints between individual interlocking elements formed by adjacent interlocking faces ending in the lower region of said pockets.

A certain amount of joint material can as it were be kept in reserve in said pockets. This joint material, which generally consists of fine sand, finds its way downward over time through the joints formed between the interlocking elements and settles in the substructure. The replenishment from said deposits or pockets ensures over quite a long period of time that there is always adequate joint material between the contact faces of individual stones. This is necessary for a stable paving stone linkage. On account of the reserve of joint material that can be taken up in the stone linkage, new material needs to be introduced from above only at comparatively great intervals in the case of a stone linkage according to the invention.

In a development of this embodiment, the interlocking elements are designed in such a way that the underengaging interlocking elements protrude laterally of the [sic] overengaging interlocking elements, but end in height below the overengaging interlocking elements. As a result, such a reserve pocket is formed between the individual interlocking elements.

It is also advantageous if, in this embodiment, the overengaging interlocking element is designed such that it falls away laterally on its upper side. This has the consequence that joint material brought to it from above can pass laterally into the pockets formed between the individual interlocking elements.

In one particular embodiment in this respect, the overengaging interlocking element is provided with a roof slope under a central gable. This roof shape offers a maximum angle of inclination over the entire width of the interlocking element, the central arrangement of the gable providing a smooth sliding path for the joint material on both sides of the gable.

In a particularly advantageous embodiment of the invention, the interlocking faces of adjacent interlocking elements are obliquely designed. In comparison with other, for example stepped shapes, this facilitates the replenishment of the downwardly disappearing joint material in the joints between the oblique interlocking faces, said joints likewise being of an oblique design.

The reserve pockets for the joint material are preferably formed at a certain distance from the upper edge of the pavement or sidewalk surfacing. When it is driven over, a certain vacuum or suction effect causes the material to be drawn away upward out of the stone linkage in the upper region between individual stones. Only when there is a certain distance of several centimeters from the upper edge of the paving stones it is ensured that the joint material kept in reserve remains in the reserve pockets.

Furthermore, it is advantageous if the underengaging interlocking elements of a particular paving stone have interlocking faces running perpendicularly downward. In this way, a stone which can be referred to as a so-called "key stone" is obtained. This stone has the property that it can be removed from the paving stone linkage even when it is surrounded by paving stones on all sides. Consequently, key stones can be provided at specific locations of the paving stone surfacing, allowing the paving stone surfacing to be taken up without damaging a stone or taking up unnecessarily large areas. In this case, the "key stone" may have a special marking, for example a half-groove or the like that is perceptible from above, in order to identify the stone in the laid area.

In a particularly advantageous embodiment of the invention, the overengaging interlocking elements are designed as "setbacks", i.e. indentations in the side wall. This design allows a possibly desired laying of the stones without joints. However, here, too, a lateral spacer has the effect of laying with joints. Furthermore, the stone with two planar side faces can be laid particularly well by machine, since optimum contacting or gripping faces are available.

Exemplary embodiments of the invention are represented in the drawings and are explained in more detail below on the basis of the description. In the drawing specifically:

FIG. 1 shows a perspective representation of a side corner of a paving stone according to the invention, FIG. 2 shows a side view of a paving stone according to the invention, FIG. 3 shows a plan view of the transitional region between two adjacent paving stones, FIG. 4 shows a laying arrangement of four adjacent paving stones which are represented spaced apart from one another to illustrate their orientation, FIG. 5 shows a perspective representation of a side corner of a key stone according to the invention, FIG. 6 shows a plan view of a paving stone with setbacks, FIG. 7 shows a side view of the paving stone according to FIG. 6, FIG. 8 shows a further side view of the paving stone according to FIG. 6, FIG. 9 shows a laying arrangement of twelve adjacent paving stones with setbacks according to FIG. 6, which engage in one another, FIG. 10 shows a plan view of a paving stone with cross-sectionally dovetail-shaped, frustoconical lugs, FIG. 11 shows a side view of the paving stone according to FIG. 10, FIG. 12 shows a further side view of the paving stone according to FIG. 10, FIG. 13 shows a laying arrangement of twelve adjacent paving stones with setbacks according to FIG. 10, which engage in one another, FIG. 14 shows a plan view of a paving stone with cross-sectionally parallelogram-shaped, frustoconical lugs, FIG. 15 shows a side view of the paving stone according to FIG. 14, FIG. 16 shows a further side view of the paving stone according to FIG. 14, FIG. 17 shows a laying arrangement of twelve adjacent paving stones with setbacks according to FIG. 14, which engage in one another, FIG. 18 shows a perspective representation of a further paving stone according to the invention from the front, FIG. 19 shows a perspective representation of the further paving stone according to the invention from the rear, FIG. 20 shows a variant of the paving stone according to FIGS. 18, 19, FIG. 20a shows a plan view of the paving stone according to FIGS. 18, 19, 20, FIG. 20b shows a view of the side wall 4 of the paving stone according to FIGS. 18, 19, 20, 20a, FIG. 20c shows a partial view of the side wall 3 of the paving stone according to FIGS. 18, 19, 20, 20a, 20b.

DESCRIPTION OF THE EXEMPLARY EMBODIMENTS

The paving stone 1 according to FIG. 1 comprises a pavement or sidewalk surface 2 and four side walls that are vertically upright with respect to said surface, of which two adjacent orthogonal side walls 3, 4 are represented in FIG. 1. Each of the side walls 3, 4 is provided with lugs, the side wall 3 having underengaging lugs 5 and the side wall 4 having overengaging lugs 6. Indicated between two overengaging lugs 6 by dashed lines is an underengaging lug 5' of an adjacent paving stone in the paving stone linkage.

The underengaging lugs 5 are of a trapezoidal structure. The overengaging lugs 6 are designed in the lower region such that they complement the underengaging lugs 5 and are provided at the top with a roof 7, with in each case a gable 8 and two roof slopes 9, 10.

The interlocking face 11 projects above the corresponding interlocking face 12 of an underengaging lug 5 over a height h (cf. FIG. 3 [sic]). This produces pockets 13 which are bounded at the sides by overengaging lugs 6 and at the bottom by underengaging lugs 5 and can be filled with joint material, for example sand. In the upward direction, the pockets 13 are completed by the roof slopes 9, 10.

On the underside of the pockets 13, the joints 14 formed between the interlocking faces 11, 12 proceed downward. The trapezoidal design of the underengaging lugs 5 and of the lower region of the overengaging lugs 6 has the effect that these joints 14 run obliquely rectilinearly downward.

The pockets 13 are arranged at a distance a, which corresponds to the distance between the gables 8 and the pavement or sidewalk surface 2, below the pavement or sidewalk surface. Consequently, the joint material within the pockets 13 cannot be drawn away by suction effects when the surfacing formed from the paving stones 1 is driven over.

The laying of a paving stone linkage comprising paving stones 15, 16, 17, 18 according to the invention can be accomplished in a customary way by inserting the respectively next paving stone from above.

The arrangement according to FIG. 4 illustrates for example how four paving stones are to be laid in relation to one another. Thus, for example, the paving stone 15 can be placed as the first stone. On both its sides that are provided with underengaging lugs 5, adjacent paving stones 16, 17 can then be placed from above with overengaging lugs 6 onto the underengaging lugs 5. In this way it is possible, for example, for an entire row to be laid, starting from the paving stone 15 and the paving stone 16. The next row would then begin with the paving stone 17 and be continued with the paving stone 18, which is placed with its overengaging lugs 6 onto the underengaging lugs 5 of the paving stones 16, 17. Consequently, in each case two stones, for example the stones 16, 17, secure an adjacent stone 15 against being lifted out vertically.

Subsequently, joint material can be introduced from above. Above the lugs 5, 6, there is between the pavements and sidewalk surfacings 2 of the paving stones 15, 16, 17, 18 a visible joint which corresponds to the lug width b and is filled with joint material. The joint material can then collect in the pockets 13 between the gables 8 of adjacent lugs 6 and, from there, run into the joints 14 between the interlocking faces 11, 12 in a replenishing manner to the extent to which it disappears from there downward into the substructure of the surfacing.

FIG. 5 shows as a special stone a paving stone 1 conFigured as a "key stone 19". In contrast with the paving stone 1 shown in FIG. 1, the side walls 3 have no underengaging, i.e. upwardly blocking, lugs 5, but instead non-blocking lugs 20 with, for example, perpendicularly downward-running interlocking faces 12. Indicated by dashed lines between two overengaging lugs 6 is a non-blocking lug 20' of an adjacent paving stone in the paving stone linkage. The non-blocking lugs 20 have a width B which is approximately equal to or less than the distance A between two overengaging lugs 6. Consequently, it is always possible for the non-blocking lugs 20 to pass through between the overengaging lugs 6 in the directions of the movement arrow C, i.e. lifting out of the stone is always possible.

The key stone 19 has, for example, one or more half-grooves 21 on its side wall 3, 4, with the aid of which it can be easily distinguished from the other paving stones 1 even in the laid state. Further identifying features may also be present.

FIG. 6 shows an alternative paving stone 1, the overengaging interlocking elements 6 of which are designed as overengaging "setbacks 22". The interlocking faces 11 are designed here as areas set back behind the side wall 4, i.e. recesses let into the side wall 4. The underengaging lugs 5 of the adjacent side walls 3 of the adjacent stone protrude into these downwardly open recesses. The side walls 4 may have spacers 23, which serve the purpose of keeping the adjacent paving stones 1 at a distance such that a joint of a defined width between the stones is ensured. The underengaging lugs 5 may have sliding nibs 24, which serve the purpose of keeping down the friction between the faces that are aligned parallel to the side wall 4 of the overengaging setbacks 22 of a first paving stone 1 and of the underengaging lugs 5 of a further paving stone when they are pushed together. Furthermore, defined abutting faces are formed in this way.

FIG. 7 reveals that the underengaging lugs 5 have again a trapezoidal cross section, the upper region of the trapezoidal lug 5 being beveled away slightly toward the side wall 3, while the side faces of the lug 5 are aligned approximately perpendicularly in relation to the side wall 3.

In FIG. 8, a side view of the side wall 4 can be seen. The overengaging setbacks 22 have in cross section a trapezoidal structure corresponding to the underengaging lugs 5.

FIG. 9 shows an arrangement of twelve paving stones with overengaging setbacks 22. The statements made with respect to FIG. 4 apply analogously to FIG. 9.

If a "key stone" is again to be placed into such a paving stone system, the overengaging setbacks 22 must have an upwardly open slit 25, through which the underengaging non-blocking lug 20 protrudes in the upward direction.

FIG. 10 shows a further variant of the paving stone 1 represented in FIG. 6. In the case of the paving stone 1 represented in FIG. 10, the underengaging lugs 5 and the overengaging setbacks 22 are conFigured in cross section in a dovetail-shaped form. Here, too, the underengaging lugs 5 may have the sliding nibs 24. Furthermore, in analogy with FIGS. 6, 8, here, too, spacers 23 may be provided on the side walls 4 (not represented).

FIGS. 11 and 12 show side views of the paving stone 1 according to FIG. 10, with FIG. 11 showing the side wall 4 with overengaging setbacks 6, 22 and FIG. 12 showing the side wall 3 with underengaging lugs 5.

In analogy with FIGS. 9 and 4, FIG. 13 shows a linkage of paving stones according to FIG. 10.

FIG. 14 shows a further variant of a paving stone 1 with overengaging setbacks 22 which are conFigured in cross section in a parallelogram-shaped form. The underengaging lugs 5 again have sliding nibs 24. In analogy with FIG. 6, the spacers 23 may be provided on the side walls 4 (not represented).

FIGS. 15 and 16 show side views of a paving stone 1 according to FIG. 14.

In analogy with FIGS. 13, 9 and 4, a paving stone linkage which comprises paving stones according to FIG. 14 can be seen in FIG. 17.

With the aid of a paving stone 1 according to the invention, a permanently stable paving stone surfacing can be laid, in which the individual stones are reliably interlocked in the vertical direction and the necessary filling with joint material is ensured over a comparatively great period of time.

It goes without saying that a stone according to the invention can be provided with further advantageous known or future measures with additional functions. Thus, for example, seepage channels can also readily be provided in a vertical or horizontal direction in order to carry surface water away more quickly in the downward direction. Similarly, the pavement or sidewalk surface may be provided for example with a separate surfacing with the respectively desired esthetic or technical function.

A paving stone according to the invention is preferably produced from moldable and possibly compactible material, in particular from concrete. Apart from concrete, all other known and future materials come into consideration. For instance, production from plastic is readily possible. Manufacture from hard solid material by appropriate machining is also possible for achieving the technical advantages, even if, from present-day aspects, production by casting or compactible, quick-drying cement [sic] is to be preferred for cost reasons.

FIG. 18 shows a further variant of a paving stone 1 from the front with a pavement or sidewalk surface 2, an underside 35 and with side walls 3, 4. Arranged on the side wall 3 are underengaging lugs 5. The side wall 4 (see FIG. 19) has overengaging lugs 6, the side walls 3, 4 lying opposite each other. The side walls 3, 4 are connected by side walls 26, 26', which are provided with spacers 27. The spacers 27 are spacers such as those known for example in principle from the representation of the applicant's international design DM/012288. The lugs 27 of the representation according to FIGS. 18–20 are designed in a rather more broad-faced manner, i.e. they give a more striking and strong impression. The distance c between two adjacent lugs corresponds approximately—taking into account the required play to the width b of a lug 27. The sides 26, 26' lying opposite each other accordingly have lugs 27, which engage in one another in an interlocking manner over the entire side face 26, 26' when they are placed together in a row.

The underengaging lugs 5 are conFigured as two-part lugs 28, which comprise a left-hand part-lug 29 and a right-hand part-lug 30. The two part-lugs 29, 30 are separated by a channel 31, which preferably runs perpendicularly or vertically. Each part-lug 29, 30 has an interlocking face 12, which lies opposite an interlocking face 11 of an overengaging lug 6 when two stones 1 are connected to each other. The channel 31 has an inlet 32 and an outlet 33. In the region of the outlet 33, the channel 31 opens into a further channel 34, which runs on the underside 35 of the paving stone 1 and is open toward said underside and toward the side walls 3, 4. Water which runs away on the paving stone 1 enters the channel 31 through the inlet 32 and leaves it in the region of the outlet 33 into the channel 34. The water runs away through the channel 34 or seeps into the underlying ground.

According to a configurational variant not represented, the paving stone 1 represented in FIG. 18 is not provided with channels 34 and/or channels 31 or with unitary lugs 5, 6.

The design of a paving stone 1 according to FIG. 18 with underengaging or overengaging lugs 5, 6 on two opposite sides 3, 4 and spacers 27 on the other two opposite sides 26, 26' is particularly advantageous. By this arrangement of the interlocking elements, better boarding is possible in the manufacture of the paving stones 1, since the installation-space-intensive slides in the mold are required only at the side wall 4 which has the overengaging lugs 6. The lower requirement for slides also makes the mold less expensive. Furthermore, the simpler shaping of the paving stones 1 has the effect that there is virtually no wastage. A further advantage of this embodiment is that other molded stone systems, which have spacers 27 or a similar interlocking formation, can be placed against the sides 26, 26' of the paving stone 1 and combined. Such stones are also known for example from the stone system according to WO 98/32925. This possibility leads to cost savings, for example in the construction of roads, since it is possible to cover the highly stressed driving area of the road with paving stones 1 with overengaging and underengaging lugs and cover the low-stressed pedestrian area with low-cost paving stones which have only a simple interlocking formation without overengagement or underengagement. Furthermore, strip-shaped patterns or guiding lines can be produced by a combination of the types of stone mentioned above.

FIG. 19 shows the paving stone 1 represented in FIG. 18 from the rear. The overengaging lugs 6 which have the mentioned interlocking faces 11 with which said lugs lie opposite the interlocking faces 12 of the underengaging lugs 5 in the laid state are arranged on the side wall 4. The overengaging lugs 6 are conFigured as two-part lugs 36, which comprise a part-lug 37 and a part-lug 38. The part-lugs 37, 38 are separated by a channel 39. The channel 39 has an inlet 40 and an outlet 41. It is envisaged that the water passing through the channel 39 seeps into the underlying ground in the region of the outlet 41. At the transitions of the side wall 4 to the side walls 26, 26', only part-lugs 37, 38 are respectively arranged. On the side wall 4, the channels 34 open out between the overengaging lugs 6. When the paving stones 1 are in the linkage, the overengaging lugs of the paving stone 1 engage over the underengaging lugs 5 of a second paving stone (not represented). The water possibly seeping into the channel 31 of the paving stone 1 can run away through the channel 34 of the paving stone 1 or through the channel 34 of the second, adjacent paving stone (not represented).

According to an embodiment of the invention not represented, two different paving stones are provided. In this case, the first paving stone has two opposite sides with overengaging lugs. The second paving stone has two opposite sides with underengaging lugs. A paving stone linkage is produced by alternately laying first and second paving stones in the transverse direction in relation to the interlocking walls lying opposite each other.

FIG. 20 shows a further variant of the paving stone 1 represented in FIGS. 18, 19. The paving stone 1 has on the underside 35 grooves 42 which are aligned parallel to one another and are designed as shallow channels 43. The grooves 42 preferably have side walls 44 running toward each other and roof faces 45 running parallel to the underside 35. The grooves 42 have a height h which defines the perpendicular distance between the underside 35 and the roof face 45. The height h lies in particular in the range between 5 and 10 mm. When the paving stone 1 is laid, the grooves 42 fill with soil material and serve as securement against displacement. Furthermore, the grooves have the effect of increasing the surface area of the underside 35 of the paving stone 1, so that the bearing load with which the paving stone acts on the underlying ground is less.

According to a configurational variant not represented, the underside 35 of the paving stone 1 has grooves and channels.

FIG. 20b shows in a dash-dotted representation an underengaging lug 5' of an adjacent paving stone in the paving stone linkage.

FIG. 20c shows in a dash-dotted representation an overengaging lug 6' of an adjacent paving stone in the paving stone linkage.

Figure 1:
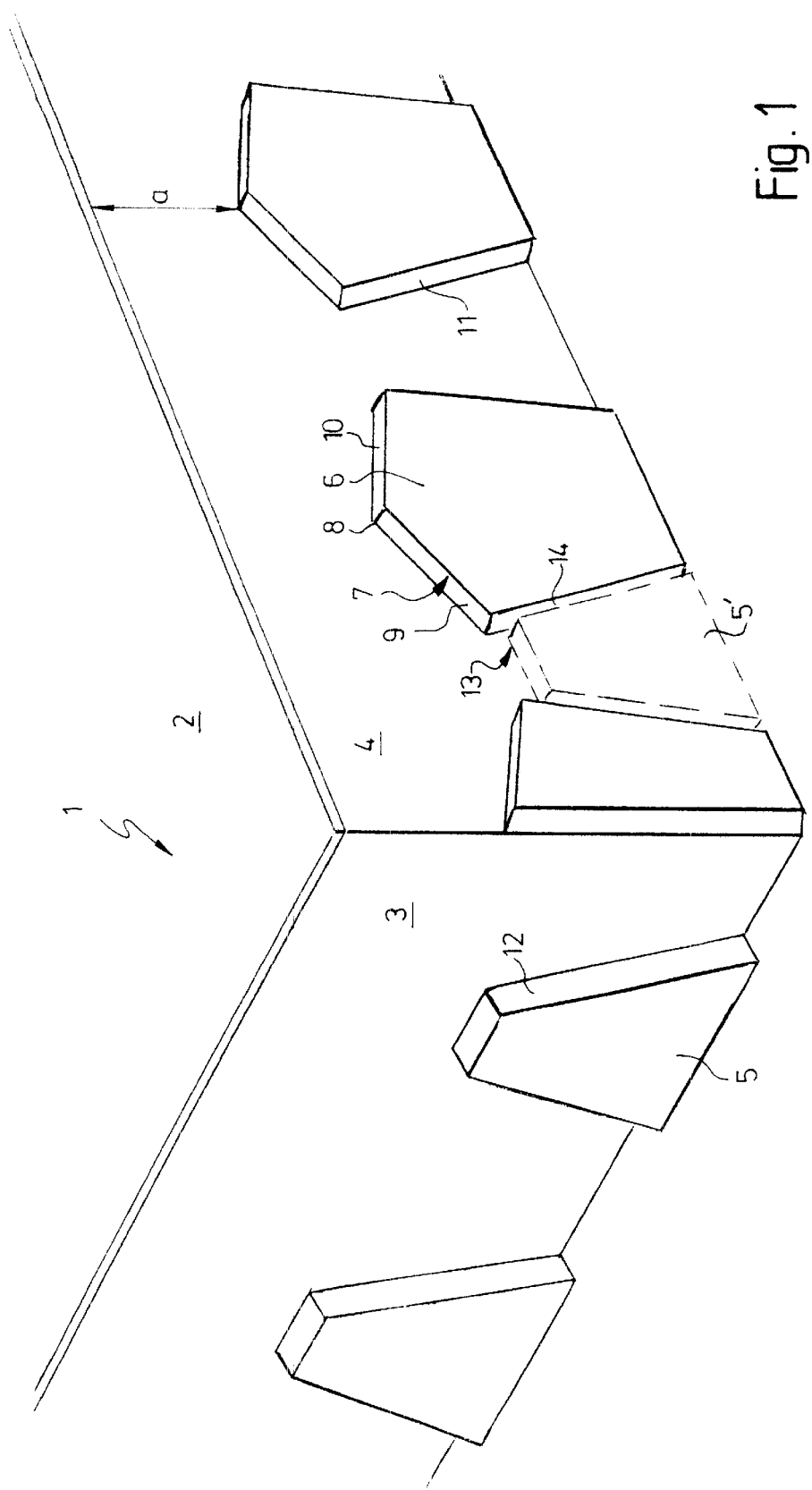
Figure 4:
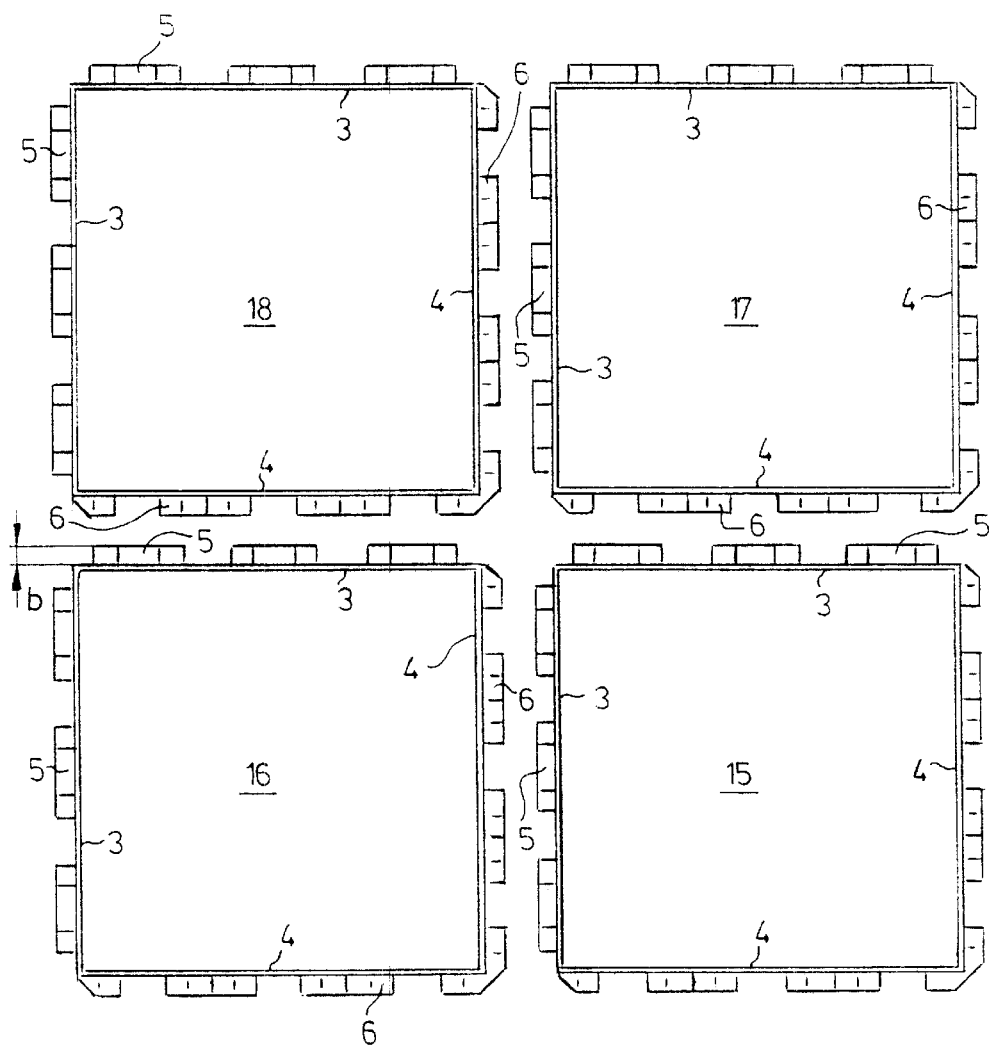
Figure 5:
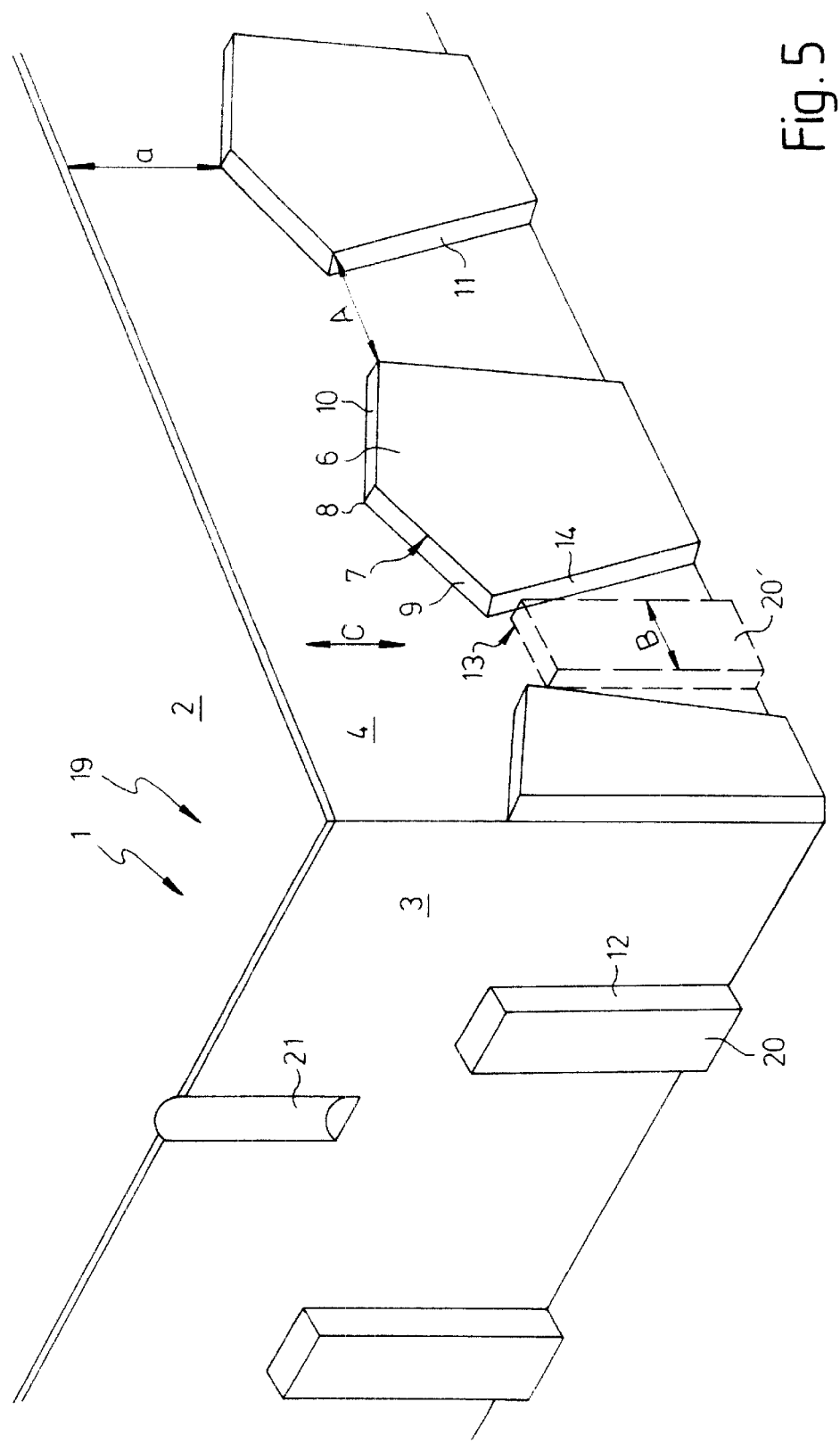
Figure 9:
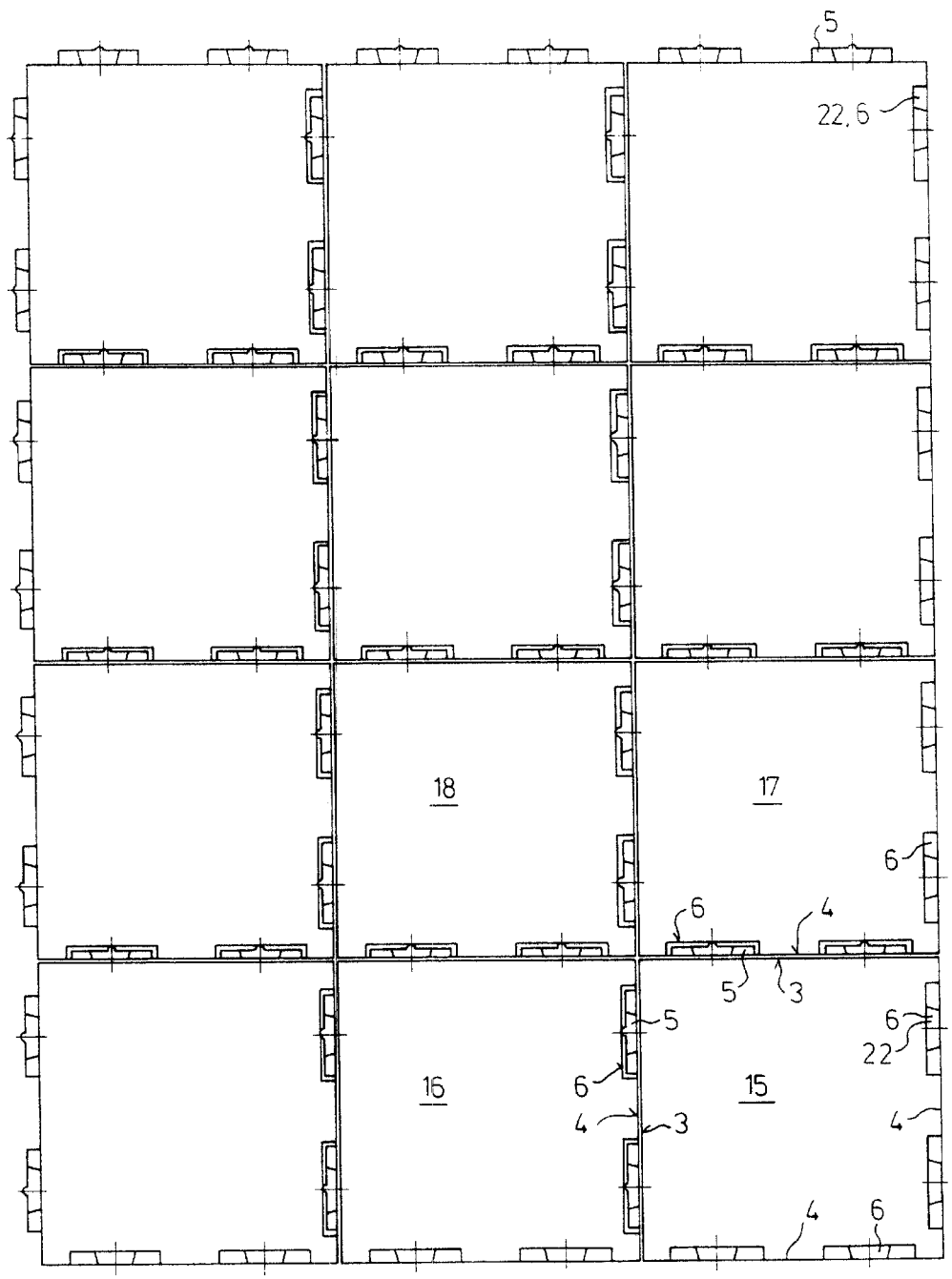
Figure 13:
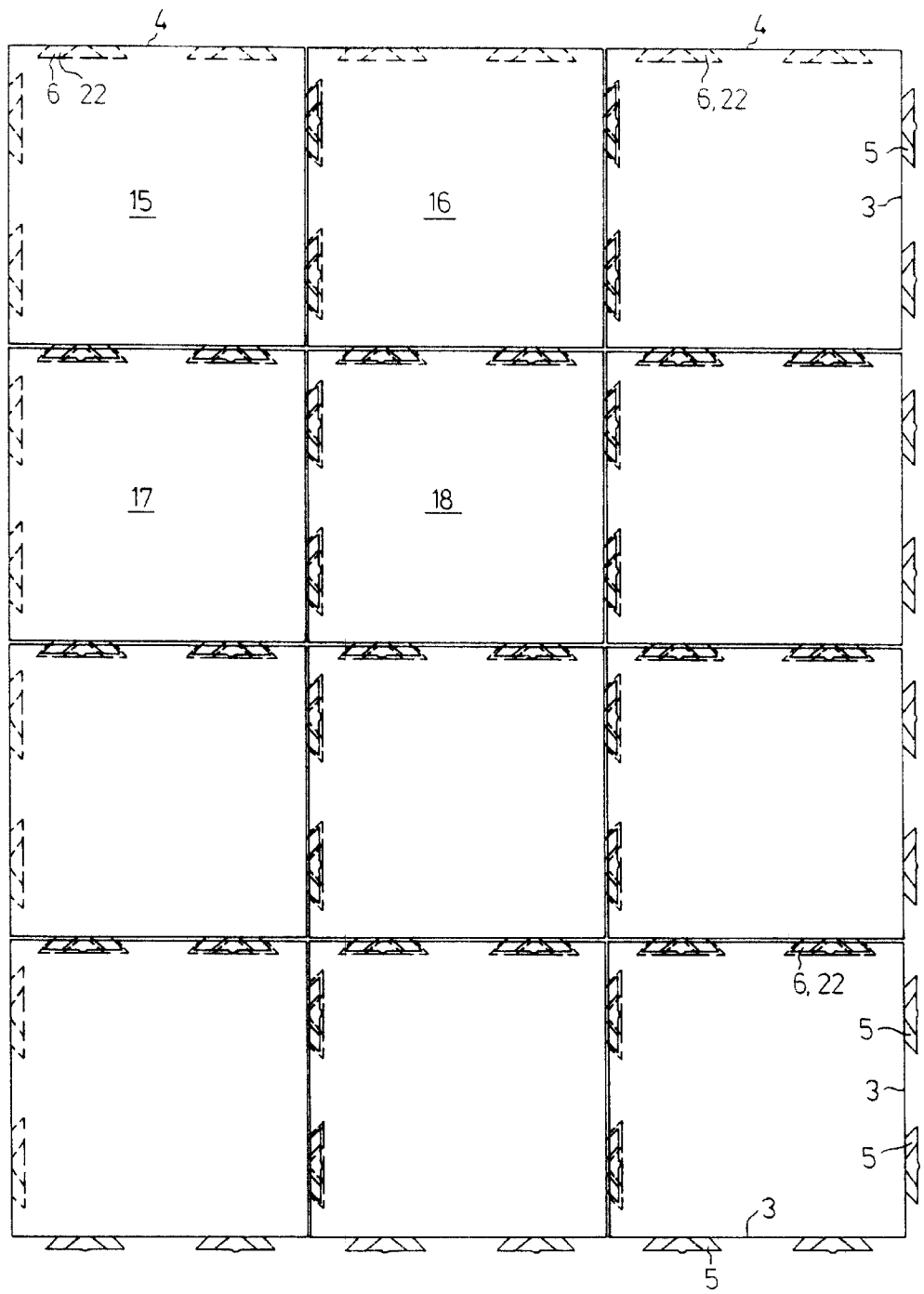
Figure 17:
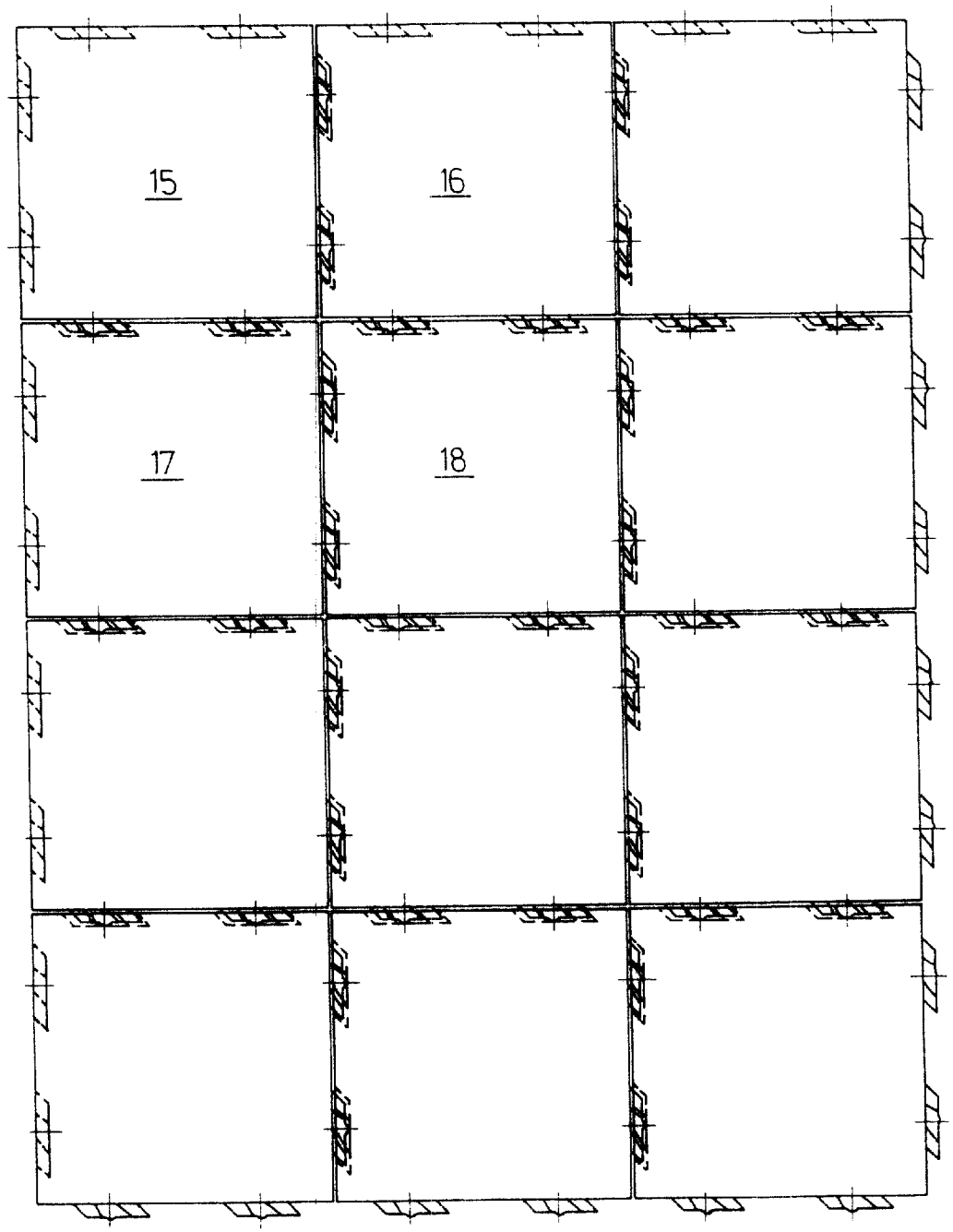
Figure 18:
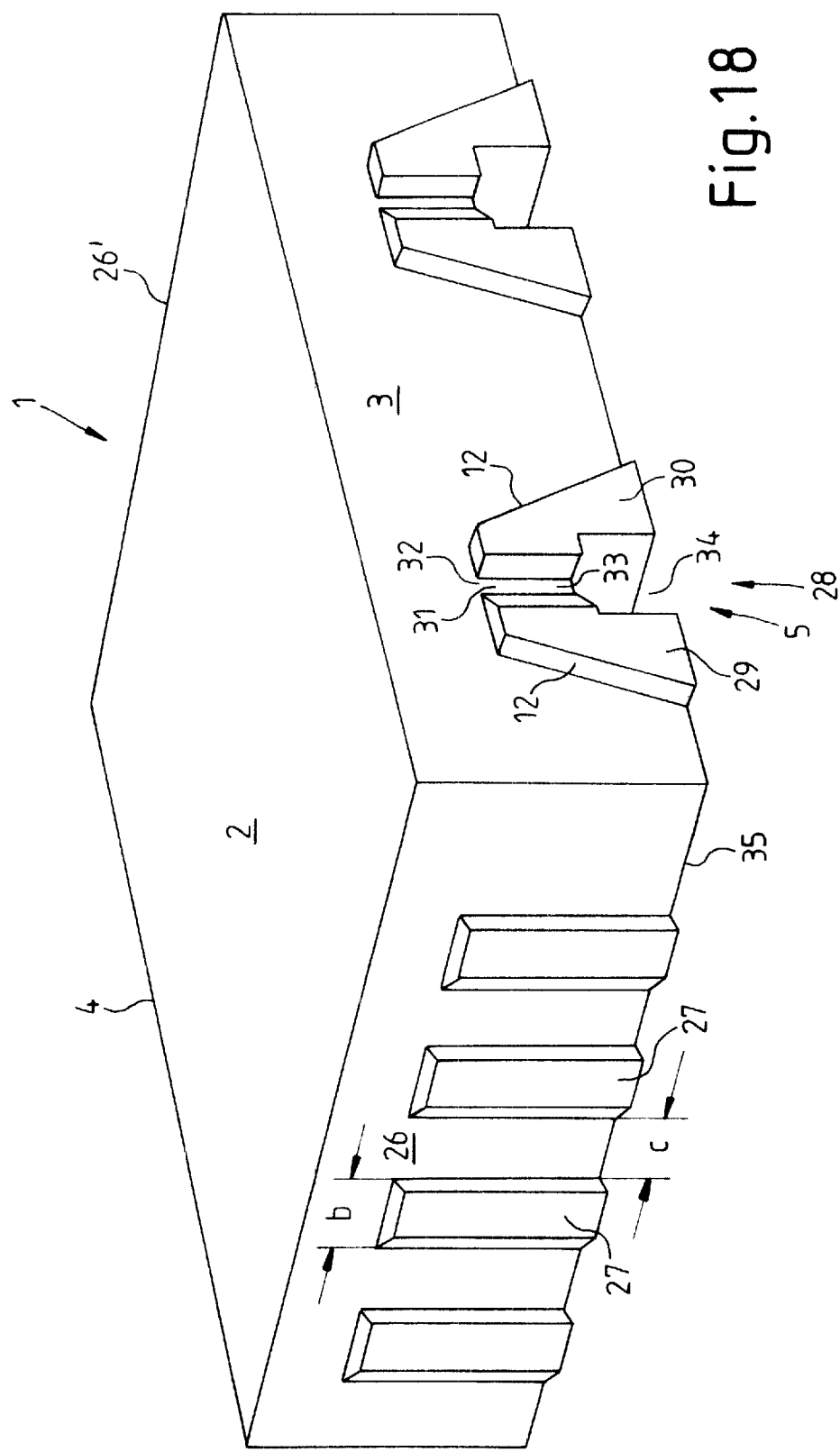
Figure 19:
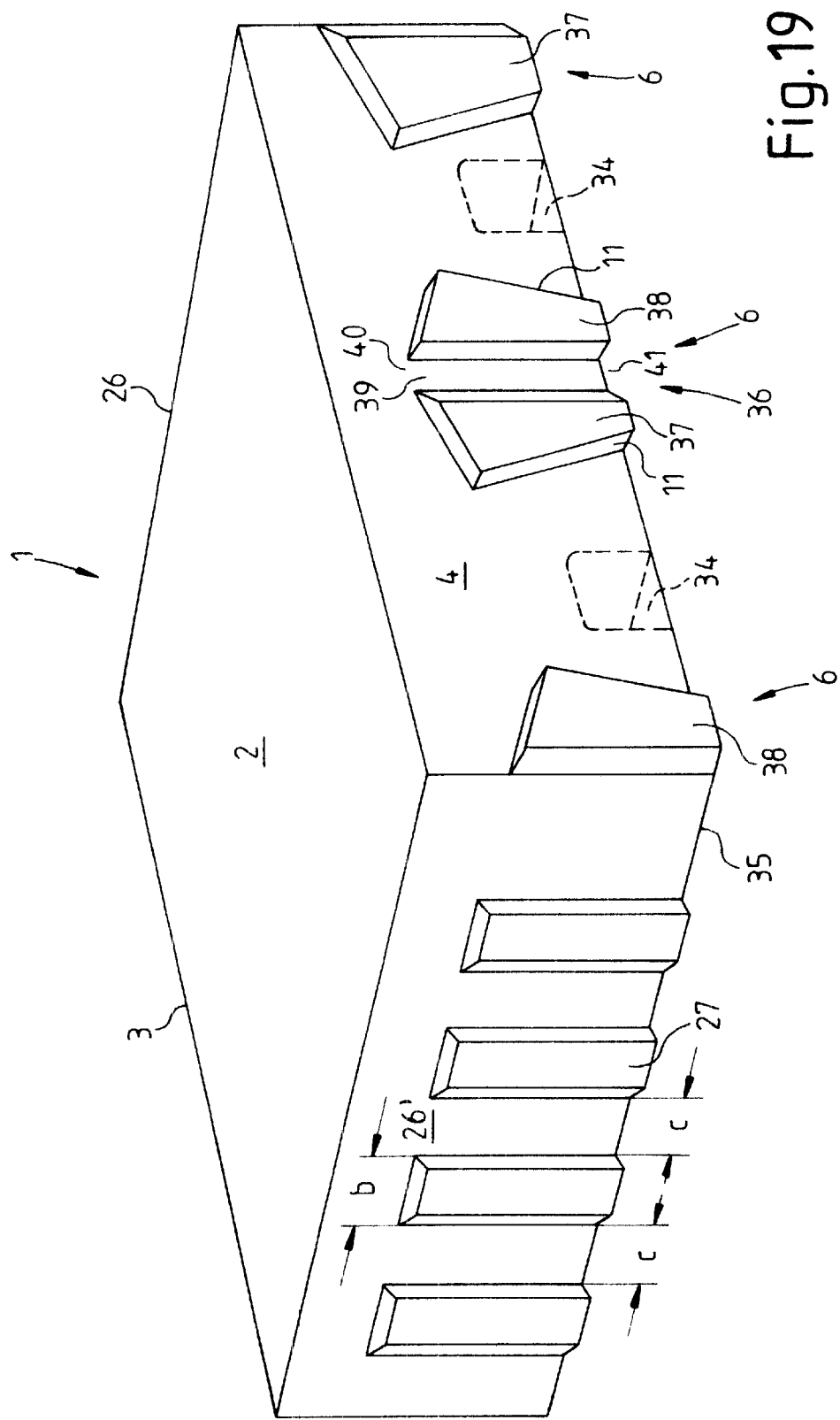
Figure 20:
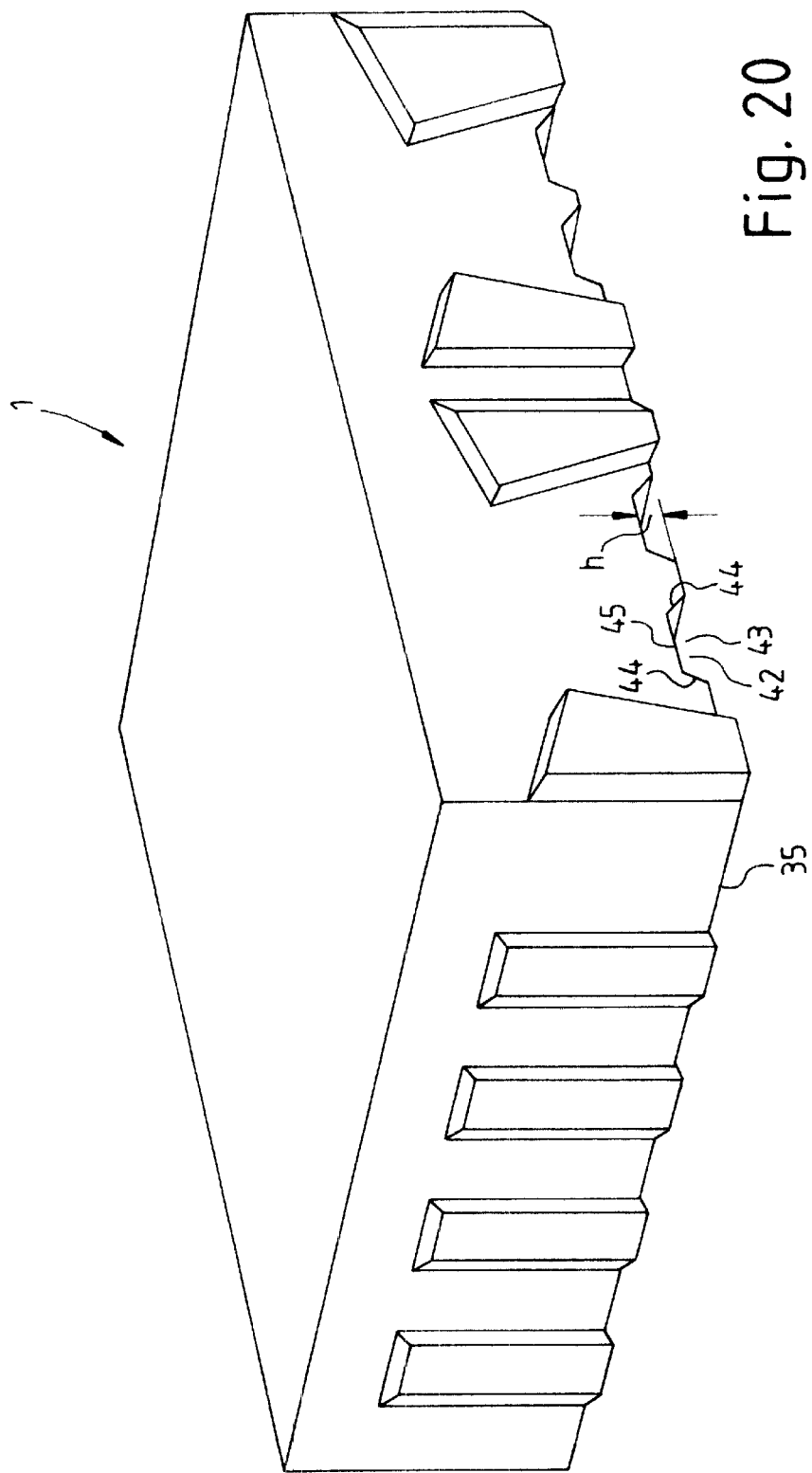
FIGS. 20a, 20b, 20c show further views of the paving stone represented in FIGS. 18, 19, 20. The same parts are provided with the same reference numerals, with FIGS. 20a, 20b, 20c being represented without the channels 34 or grooves 42 for simplification.
Figure 20A:
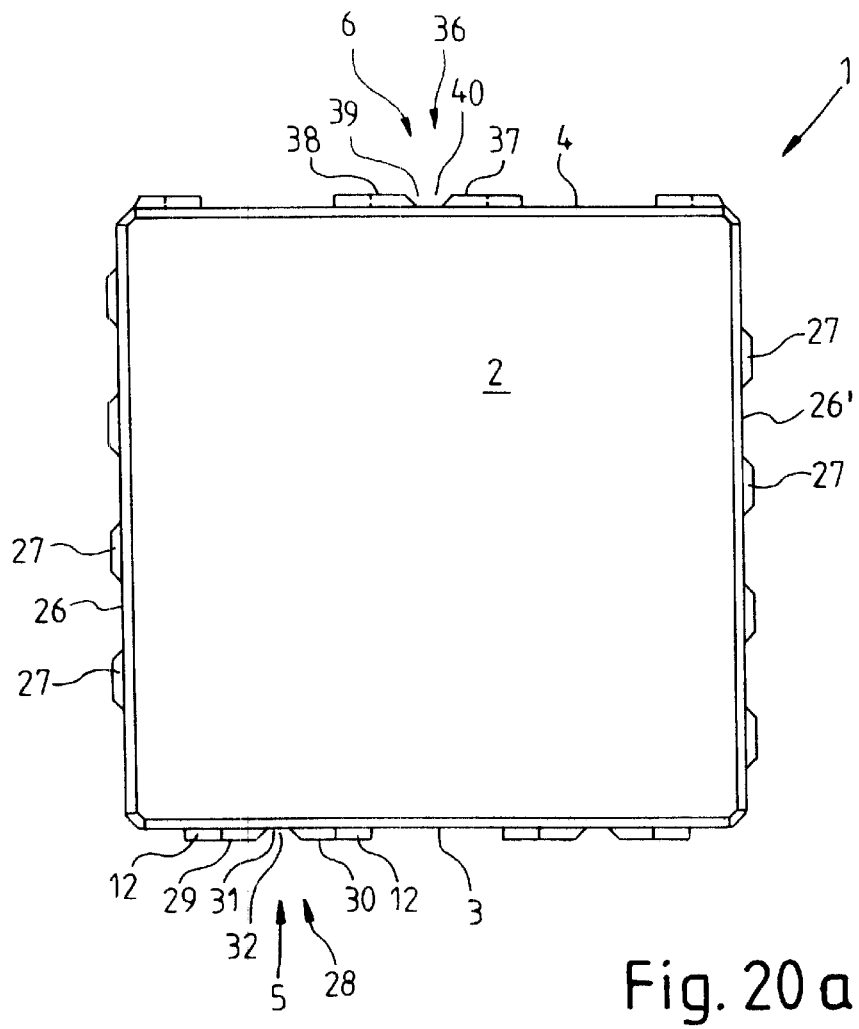
Figure 20:
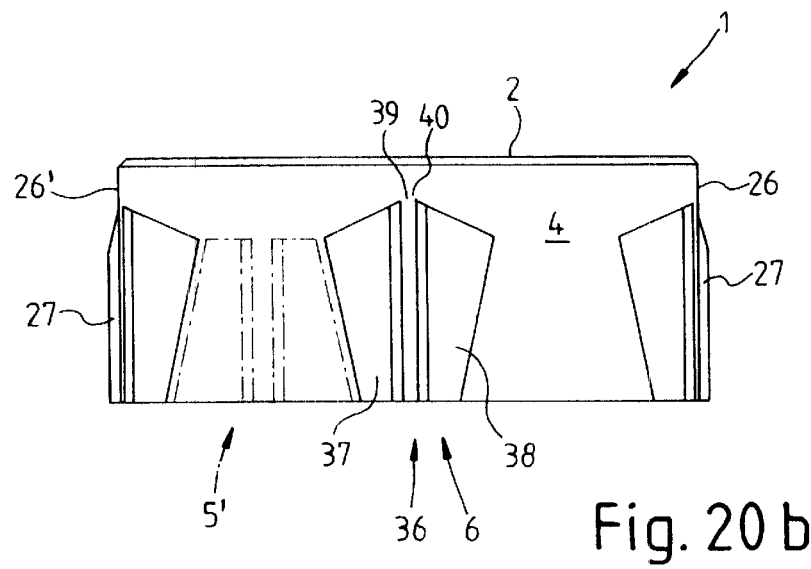
Figure 20:
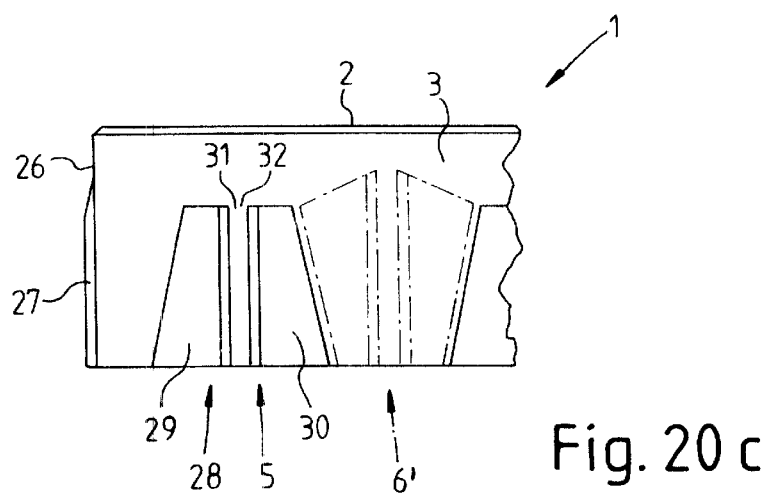

The invention is not restricted to the exemplary embodiments represented and described. Rather, it also comprises all variants within the scope of the claims.

List of Reference Numerals 1 paving stone
2 pavement or sidewalk surface
3 side wall
4 side wall
5 underengaging lug
6 overengaging lug
7 roof
8 gable
9 roof slope
10 roof slope
11 interlocking face
12 interlocking face
13 pocket
14 joint
15 paving stone
16 paving stone
17 paving stone
18 paving stone
19 key stone
20 non-blocking lug
21 half-groove
22 overengaging setback
23 spacer
24 sliding nib
25 slit
26 side wall
27 spacer
28 two-part lug 29 part-lug
30 part-lug
31 channel
32 inlet
33 outlet
34 channel
35 underside
36 two-part lug
37 part-lug
38 part-lug
39 channel
40 inlet
41 outlet
42 groove
43 channel
44 side wall
45 roof face

What is claimed is:

1. A paving stone comprising:

an upper surface;

side walls perpendicular to the upper surface, at least a first side wall of the side walls having at least one underengaging lug projecting therefrom, wherein the at least one underengaging lug has a face surface parallel to the first side wall and edge surfaces joining the face surface, the underengaging lug having a trapezoidal-shaped cross section taken perpendicular to the face surface with first and second of the edge surfaces being parallel to each other and third and fourth of the edge surfaces inclined toward each other relative to the direction of the upper surface, and at least a second side wall of the side walls having at least one overengaging lug, wherein the at least one overengaging lug has a face surface parallel to the second side wall and edge surfaces joining the face surface, with two of the edge surfaces being inclined away from each other relative to the direction of the upper surface, wherein the underengaging lug and the overengaging lug form a vertical interlocking system when the underengaging lug engages with an overengaging lug of a first adjacent paving stone and the overengaging lug engages with an underengaging lug of a second adjacent paving stone.

2. The paving stone according to claim 1, wherein:

the first side wall has only multiple underengaging lugs projecting therefrom, wherein each of the underengaging lugs has a face surface parallel to the first side wall and edge surfaces joining the face surface, each of the underengaging lugs having a trapezoidal-shaped cross section taken perpendicular to the face surface with first and second of the edge surfaces being parallel to each other and third and fourth of the edge surfaces inclined toward each other relative to the direction of the upper surface.

3. The paving stone according to claim 1, wherein:

the second side wall has only multiple overengaging lugs, wherein each of the overengaging lugs has a face surface parallel to the second side wall and edge surfaces joining the second side wall, with two of the edge surfaces being inclined away from each other relative to the direction of the upper surface.

4. The paving stone according to claim 1, wherein:

at least a third side wall of the side walls has at least one underengaging lug projecting therefrom, wherein the at least one underengaging lug has a face surface parallel to the first side wall and edge surfaces joining the face surface, the underengaging lug having a trapezoidal-shaped cross section taken perpendicular to the face surface with first and second of the edge surfaces being parallel to each other and third and fourth of the edge surfaces inclined toward each other relative to the direction of the upper surface.

5. The paving stone according to claim 1, wherein:

at least a third side wall of the side walls has at least one overengaging lug, wherein the at least one overengaging lug has a face surface parallel to the third side wall and edge surfaces joining the third side wall, with two of the edge surfaces inclined away from each other relative to the direction of the upper surface, wherein the third side wall is orthogonal to and adjacent the second side wall.

6. The paving stone according to claim 1, wherein pockets for joint material are formed when the underengaging lug engages with an overengaging lug of a first adjacent paving stone and the overengaging lug engages with an underengaging lug of a second adjacent paving stone.

7. The paving stone according to claim 1, wherein the edge surfaces of the at least one overengaging lug include at least two additional edge surfaces inclined toward each other relative to the direction of the upper surface.

8. The paving stone according to claim 7, wherein the two additional edge surfaces intersect each other.

9. The paving stone according to claim 1, wherein the first edge surface of the at least one underengaging lug is parallel to the upper surface and the third and fourth edge surfaces of the underengaging lug form obtuse angles with the first edge surface.

10. The paving stone according to claim 1, wherein a first of the two edge surfaces of the overengaging lug is orthogonal to the upper surface.

11. The paving stone according to claim 1, wherein neither of the two edge surfaces of the overengaging lug is orthogonal to the upper surface.

12. A paving stone comprising:

an upper surface;

side walls perpendicular to the upper surface;

at least a first side wall of the side walls having at least one underengaging lug projecting therefrom, wherein the at least one underengaging lug has a face surface parallel to the first side wall and edge surfaces joining the face surface, the underengaging lug having a trapezoidal-shaped cross section taken perpendicular to the face surface with first and second of the edge surfaces being parallel to each other and third and fourth of the edge surfaces inclined toward each other relative to the direction of the upper surface, and at least a second side wall of the side walls having at least one overengaging setback, wherein the at least one overengaging setback has a face surface parallel to the second side wall and edge surfaces joining the face surface, with two of the edge surfaces being inclined toward each other relative to the direction of the upper surface;

wherein the underengaging lug and the overengaging setback form a vertical interlocking system when the underengaging lug engages with an overengaging setback of a first adjacent paving stone and the overengaging setback engages with an underengaging lug of a second adjacent paving stone.

13. The paving stone according to claim 12, wherein:

the first side wall has only multiple underengaging lugs projecting therefrom, wherein each of the underengaging lugs has a face surface parallel to the first side wall and edge surfaces joining the face surface, each of the underengaging lugs having a trapezoidal-shaped cross section taken perpendicular to the face surface with first and second of the edge surfaces being parallel to each other and third and fourth of the edge surfaces inclined toward each other relative to the direction of the upper surface.

14. The paving stone according to claim 12, wherein:

the second side wall has only multiple overengaging setbacks, wherein each of the overengaging setbacks has a face surface parallel to the second side wall and edge surfaces joining the face surface, with two of the edge surfaces being inclined away from each other relative to the direction of the upper surface.

15. The paving stone according to claim 12 wherein:

at least a third side wall of the side walls has at least one underengaging lug projecting therefrom, wherein the at least one underengaging lug has a face surface parallel to the first side wall and edge surfaces joining the face surface, the underengaging lug having a trapezoidal-shaped cross section taken perpendicular to the face surface with first and second of the edge surfaces being parallel to each other and third and fourth of the edge surfaces inclined toward each other relative to the direction of the upper surface.

16. The paving stone according to claim 12 wherein:

at least a third side wall of the side walls has at least one overengaging setback, wherein the at least one overengaging setback has a face surface parallel to the third side wall and edge surfaces joining the face surface, with two of the edge surfaces inclined away from each other relative to the direction of the upper surface, wherein the third side wall is orthogonal to and adjacent the second side wall.

17. The paving stone according to claim 12, wherein the first edge surface of the underengaging lug is parallel to the upper surface.

18. The paving stone according to claim 17, wherein the third and fourth edge surfaces of the underengaging lug form obtuse angles with the first edge surface.

19. The paving stone according to claim 17, wherein the third edge surface of the underengaging lug is orthogonal to the first edge surface.

20. The paving stone according to claim 12, wherein a first of the two edge surfaces of the overengaging lug is orthogonal to the upper surface.

21. The paving stone according to claim 12, wherein neither of the two edge surfaces of the overengaging lug is orthogonal to the upper surface.

* * * * *